United States Patent
Hong

(10) Patent No.: US 7,242,677 B2
(45) Date of Patent: Jul. 10, 2007

(54) LINK METHOD CAPABLE OF ESTABLISHING LINK BETWEEN TWO BLUETOOTH DEVICES LOCATED IN A BLUETOOTH SCATTERNET

(75) Inventor: Alexander T. P. Hong, Taipei (TW)

(73) Assignee: Institute for Information Industry, Taipei (TW)

( * ) Notice: Subject to any disclaimer, the term of this patent is extended or adjusted under 35 U.S.C. 154(b) by 864 days.

(21) Appl. No.: 10/434,200

(22) Filed: May 9, 2003

(65) Prior Publication Data
US 2004/0223482 A1    Nov. 11, 2004

(51) Int. Cl.
H04J 3/16    (2006.01)
(52) U.S. Cl. .................. 370/346; 370/338; 370/348; 455/41.2; 455/41.3; 455/450; 455/451; 455/452; 455/453
(58) Field of Classification Search ............. 455/41.2, 455/41.3, 450, 451, 452, 453; 370/338, 346, 370/348
See application file for complete search history.

(56) References Cited

U.S. PATENT DOCUMENTS 6,751,200 B1 * 6/2004 Larsson et al. ............. 370/255
6,775,258 B1 * 8/2004 van Valkenburg et al. .. 370/338
6,876,643 B1 * 4/2005 Aggarwal et al. .......... 370/338
6,901,057 B2 * 5/2005 Rune et al. ................. 370/310
6,975,613 B1 * 12/2005 Johansson ................... 370/338
2002/0044549 A1 * 4/2002 Johansson et al. .......... 370/386

OTHER PUBLICATIONS

Cisco Router Internetworking, Paul Ammann, 2000, McGraw Hill, pp. 184-186.*

* cited by examiner

Primary Examiner—Steven M. D'Agosta
(74) Attorney, Agent, or Firm—Bacon & Thomas, PLLC

(57) ABSTRACT

A link method for establishing a link between two bluetooth devices is provided to enable a device to transfer data to/from other device located in a bluetooth scatternet. The link method executes a link initialization procedure when resetting or initializing a link to determine whether the role of the bluetooth device at a dedicated link is a slave or master. Then, in the link search establishment procedure, it searches all possible paths for transferring data packet and establishes a link path table. Finally, when the link detection timer expires after a pre-determined period, the link detection procedure is resumed to detect whether the link is existed. If the link is not existed, the link initialization procedure is executed; otherwise, it further determines whether to execute the link initialization procedure again. If yes, the link initialization procedure is executed, otherwise the link detection procedure is executed.

10 Claims, 7 Drawing Sheets

LINK METHOD CAPABLE OF ESTABLISHING LINK BETWEEN TWO BLUETOOTH DEVICES LOCATED IN A BLUETOOTH SCATTERNET

BACKGROUND OF THE INVENTION

1. Field of the Invention

The present invention relates to the technical field of bluetooth scatternet and, more particularly, to a link method that is used in a bluetooth scatternet.

2. Description of Related Art

FIG. 1 schematically illustrates the data transfer in a bluetooth network. The whole network is divided into several isolated piconets. In each piconet, there are one master bluetooth device and multiple salve bluetooth devices. The master device controls the data transfer procedure to and from the target slave device in a piconet. In the specification of bluetooth, a scatternet that is formed by multiple piconets is mentioned. However, in the specification, there is no rule and guideline provided for data transfer in a scatternet. As shown in FIG. 2, although all piconets can form a scatternet, in accordance with the current specification and technology of piconet and scatternet, data can only be transferred inside a specific piconet but not crossing the boundary of the piconet. That is, data cannot be transferred in a scatternet, link search table cannot be established and initialized in a scatternet and link search table cannot be updated as the link is broken in a scatternet. Therefore, there is a need to have a novel design to transfer data in a scatternet that can mitigate and/or obviate the aforementioned problems.

SUMMARY OF THE INVENTION

The object of the present invention is to provide a link method capable of establishing link between two bluetooth devices located in a scatternet based on the bluetooth technology, so as to remove the limitation of the current bluetooth technology that can only transfer data in a piconet.

To achieve this object, there is provided a link method for establishing a link between two bluetooth devices located in a bluetooth scatternet. The bluetooth device includes multiple link detection timers, a detection procedure timer, multiple master/slave flags, an initialization procedure executing timer, an initialization procedure trigger timer and a link missing time. The method comprises: (A) a link initialization procedure for determining whether the role of this bluetooth device at a dedicated link is a slave or a master and initializing the corresponding timers when resetting or initializing a link; (B) a link search establishment procedure for searching all possible paths to transfer data packets and establishing a link path table; and (C) a link detection procedure for resuming to detect whether the link is existed or not when the corresponding link detection timer of a link expires after a pre-determined period.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
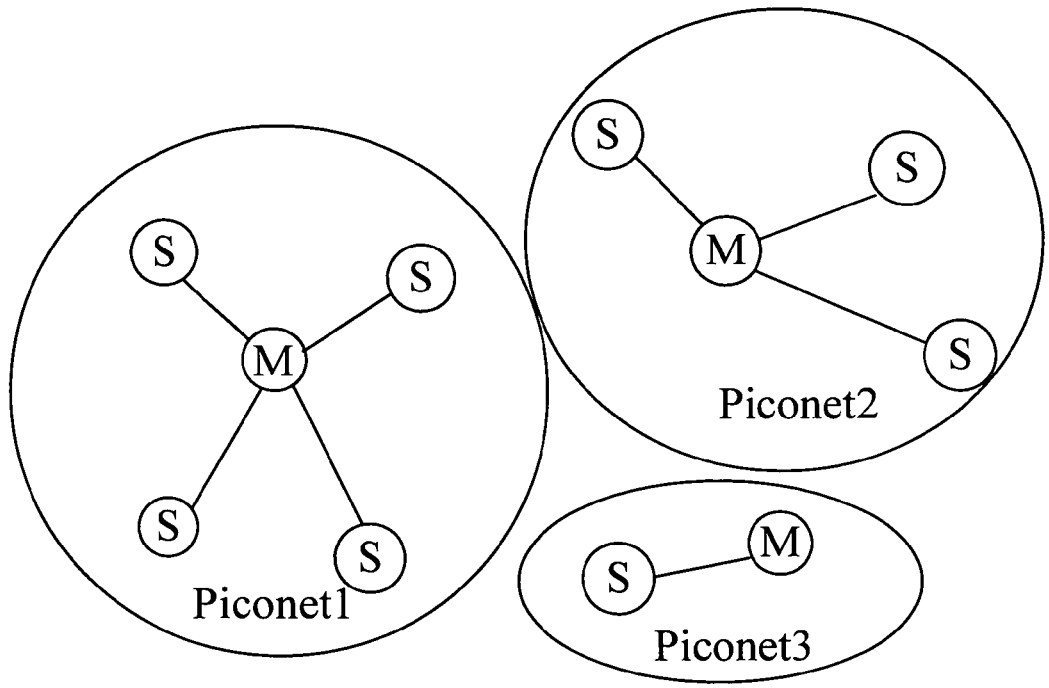
FIG. 1 shows the data transfer in a conventional bluetooth piconet.
Figure 2:
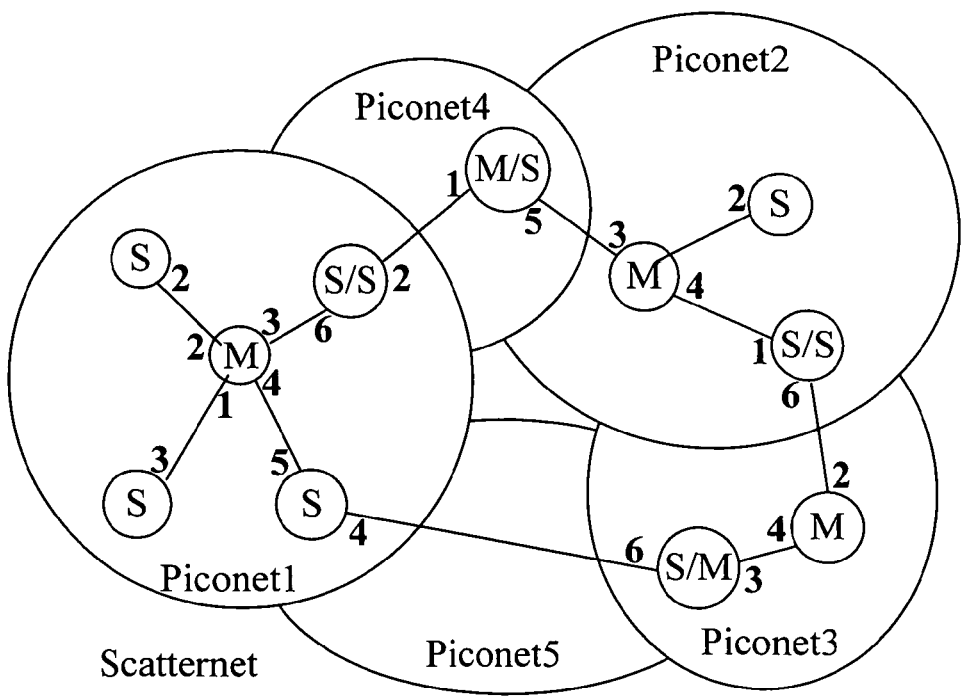
FIG. 2 shows multiple piconets forming a scatternet in conventional bluetooth.
Figure 3:
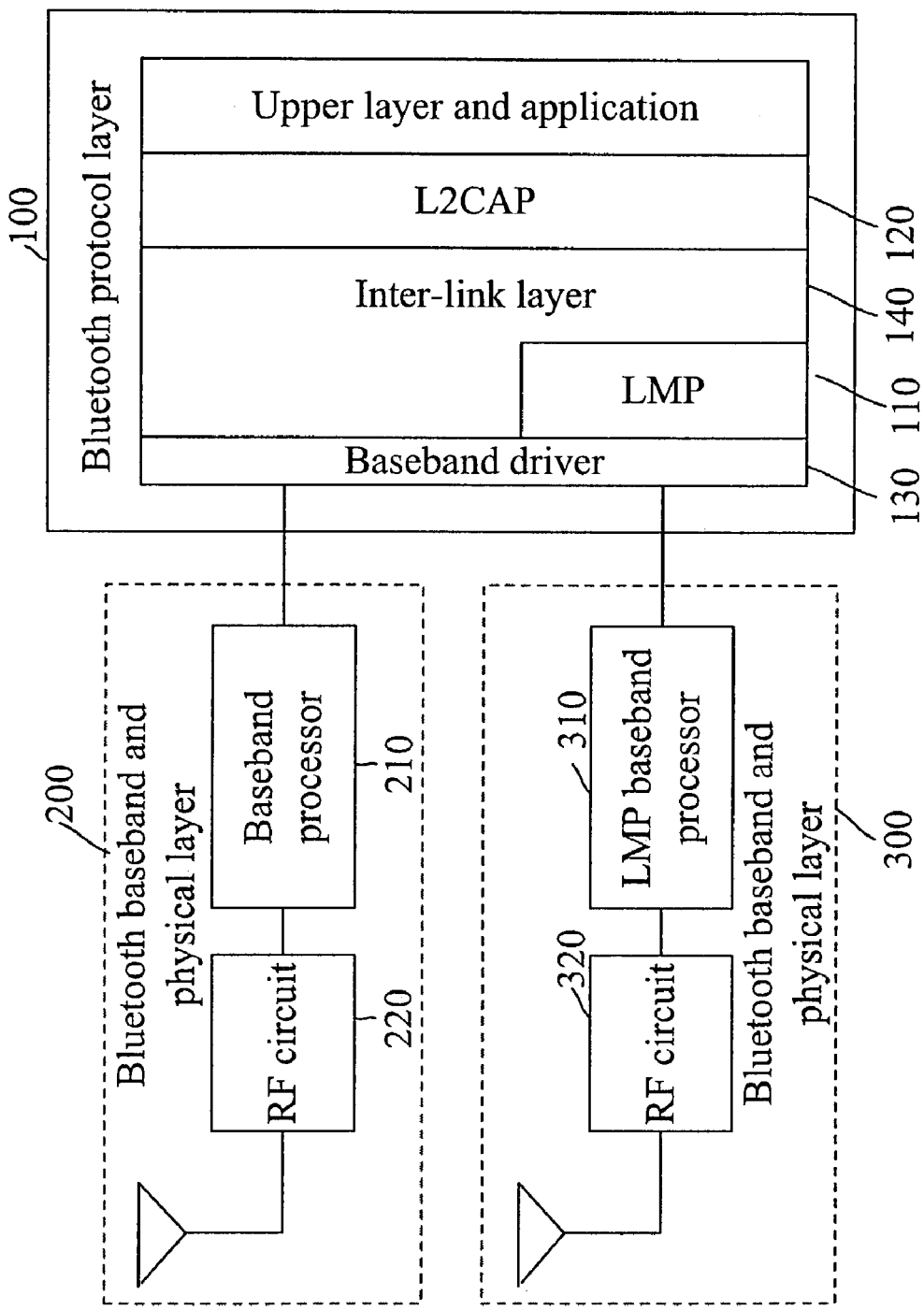
FIG. 3 shows the system architecture of a bluetooth device in accordance with the present invention.

Referring now to FIG. 3, there is illustrated the system architecture of a bluetooth device in accordance with the present invention. The device has a bluetooth protocol layer 100 and a bluetooth baseband and physical layer 200. The bluetooth protocol layer 100 has a logical link control and adaptation protocol (L2CAP) 120 and a link manager protocol (LMP) 110 for handling the corresponding protocol of bluetooth technology. The bluetooth baseband and physical layer 200 has a baseband processor 210 and a RF circuit 220 for handling the corresponding baseband and radio frequency of bluetooth technology. When exhausting the bandwidth of bluetooth channel and affecting the data transmitting by executing the link searching method of the present invention, it can add a bluetooth baseband and physical layer 300, an inter-link layer 140, a baseband drivers 130 as shows in FIG. 3. The bluetooth baseband and physical layer 300 executes exclusively for link manager protocol (LPM) and connects with the baseband drivers 130. The inter-link layer 140 provides an interface between the logical link control and adaptation protocol (L2CAP) 110 and the baseband drivers 130.

Figure 4:
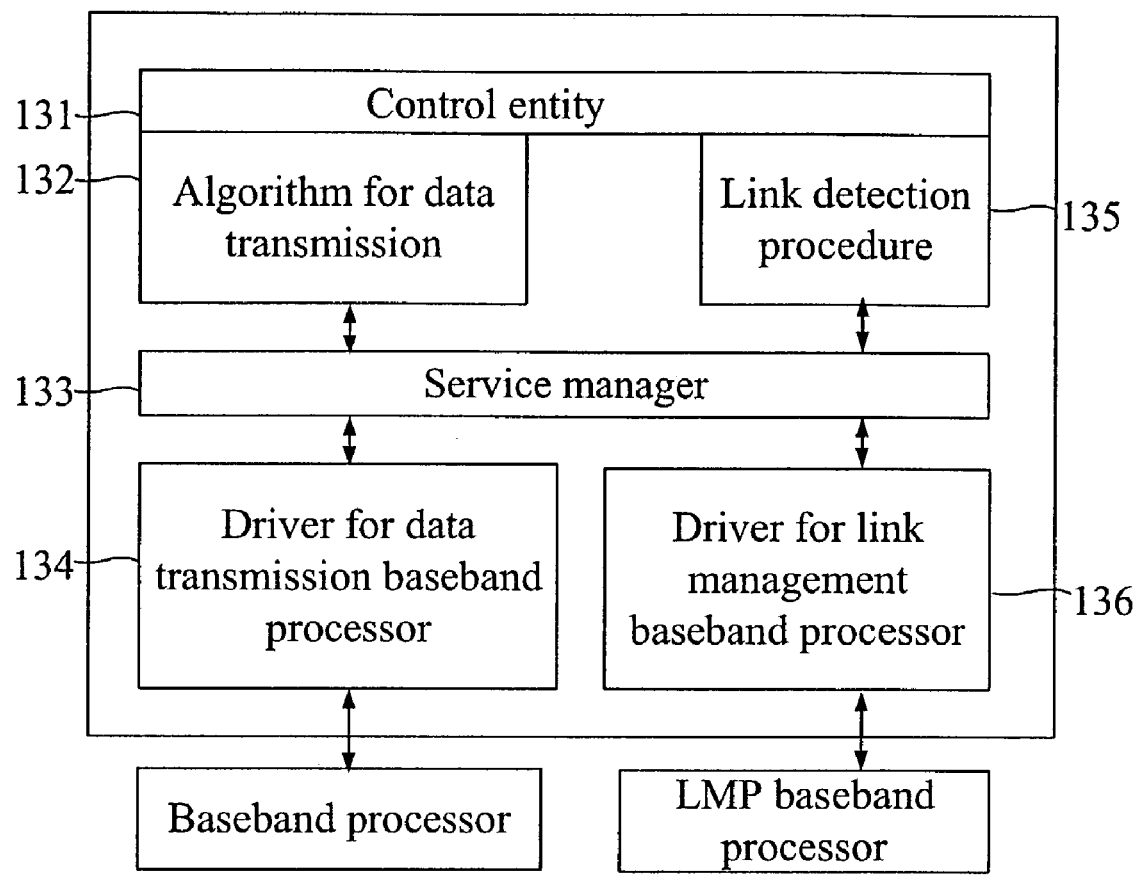
FIG. 4 shows the architecture of the baseband driver of the present invention.

FIG. 4 shows an architecture of the baseband driver 130 of the present invention that comprises a control entity 131, a data transmission procedure 132, a service manager 133, a driver for data transmission baseband processor 134, a link detection procedure 135 and a driver for link management baseband processor 136. In comparison with the conventional bluetooth baseband driver, the link detection procedure 135 and the driver for link management baseband processor 136 are provided to execute the management of links for preventing the bandwidth of the data transmission from being reduced.

Figure 5:
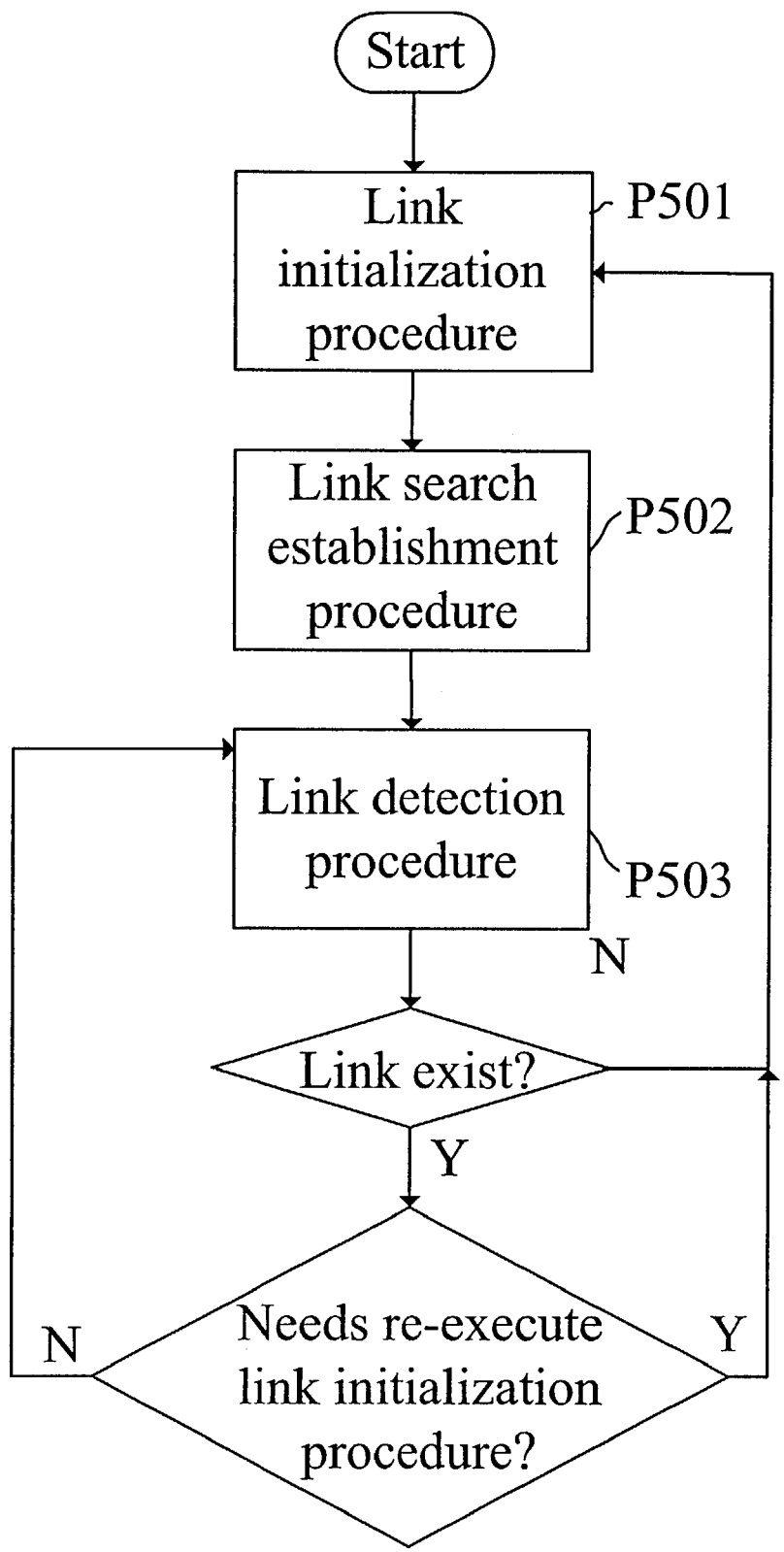
FIG. 5 shows the flowchart for link method of the present invention.

FIG. 5 shows an embodiment of the link method for a bluetooth scatternet according to the present invention, which transfers a data packet between bluetooth devices in a scatternet. The bluetooth device according to the present invention comprises multiple link detection timers, a detection procedure timer, multiple master/slave flags, an initialization procedure executing timer, an initialization procedure trigger timer and a link missing timer. The link method executes a link initialization procedure 9P105) first. When resetting or initializing a link, the link initialization procedure determines whether the bluetooth device is a slave or a master device and initializes the corresponding timers. In the link search establishment procedure (P502), it searches all possible paths for transferring data packets and establishes a link path table. Then, when the corresponding link detection timer of a link expires after a pre-determined period, the link detection procedure (P503) is resumed to detect whether the link is existed or not. If the link is not existed, the process goes back to the link initialization procedure (P501). If the link is existed, it further determines whether to execute the link initialization procedure again. If yes, the process goes back to link initialization procedure (P501), otherwise the process goes back to the link detection procedure (P503).

Figure 6:
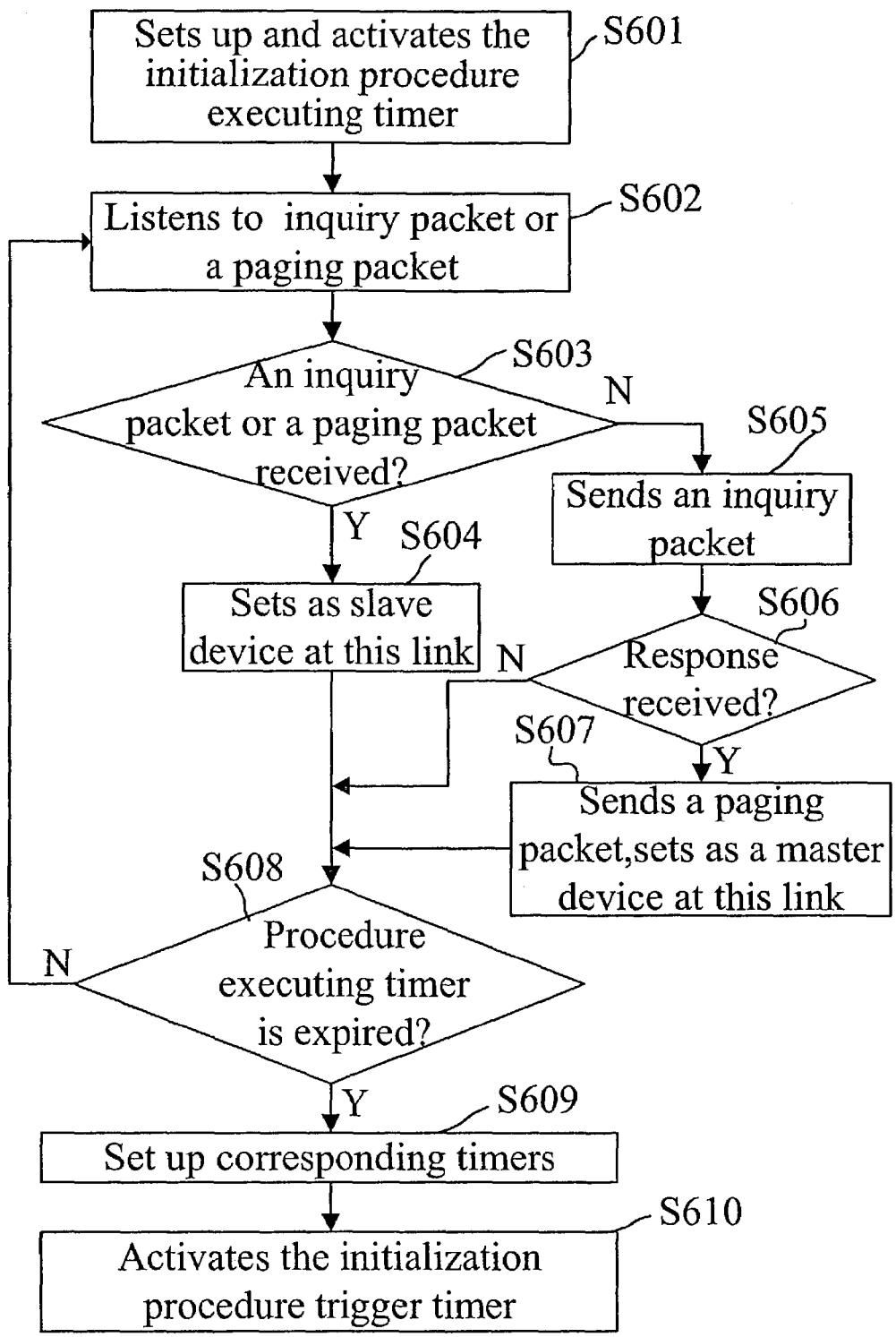
FIG. 6 shows the flowchart for link initialization procedure of the present invention.

FIG. 6 shows the flowchart for link initialization procedure (P501) in accordance with the present invention. As shown, in step S601, the process sets up and activates the initialization procedure executing timer of a bluetooth device in accordance with the present invention. In step S602, when resetting or initializing a link, the bluetooth device listens to the bluetooth channel to detect whether there is an inquiry packet or a paging packet.

In step S603, the device determines whether an inquiry packet or a paging packet is received. If yes, the process goes to step S604, otherwise the process goes to step S605. In step S604, the device is a slave bluetooth device on the link and sets the corresponding master/slave flag as a slave state. In step S605, the device sends an inquiry packet, and then determines whether response packets of the inquiry are received (step S606). If no, the process goes to step S608, otherwise the process goes to step S607. In step S607, the device sends a paging packet and receives its response. The device is a master bluetooth device on the link and sets the master/slave flag as a master state.

In step S608, it determines whether the initialization procedure executing timer is expired or not. If no, the process goes back to step S602, otherwise the process goes to step S609. in step S609, the device sets up its multiple link detection timers, the detection procedure timer, the initialization procedure trigger timer and the link missing timer. If the device has n links, it sets up n link detection timers. In step S610, the device activates the initialization procedure trigger timer.

Figure 7:
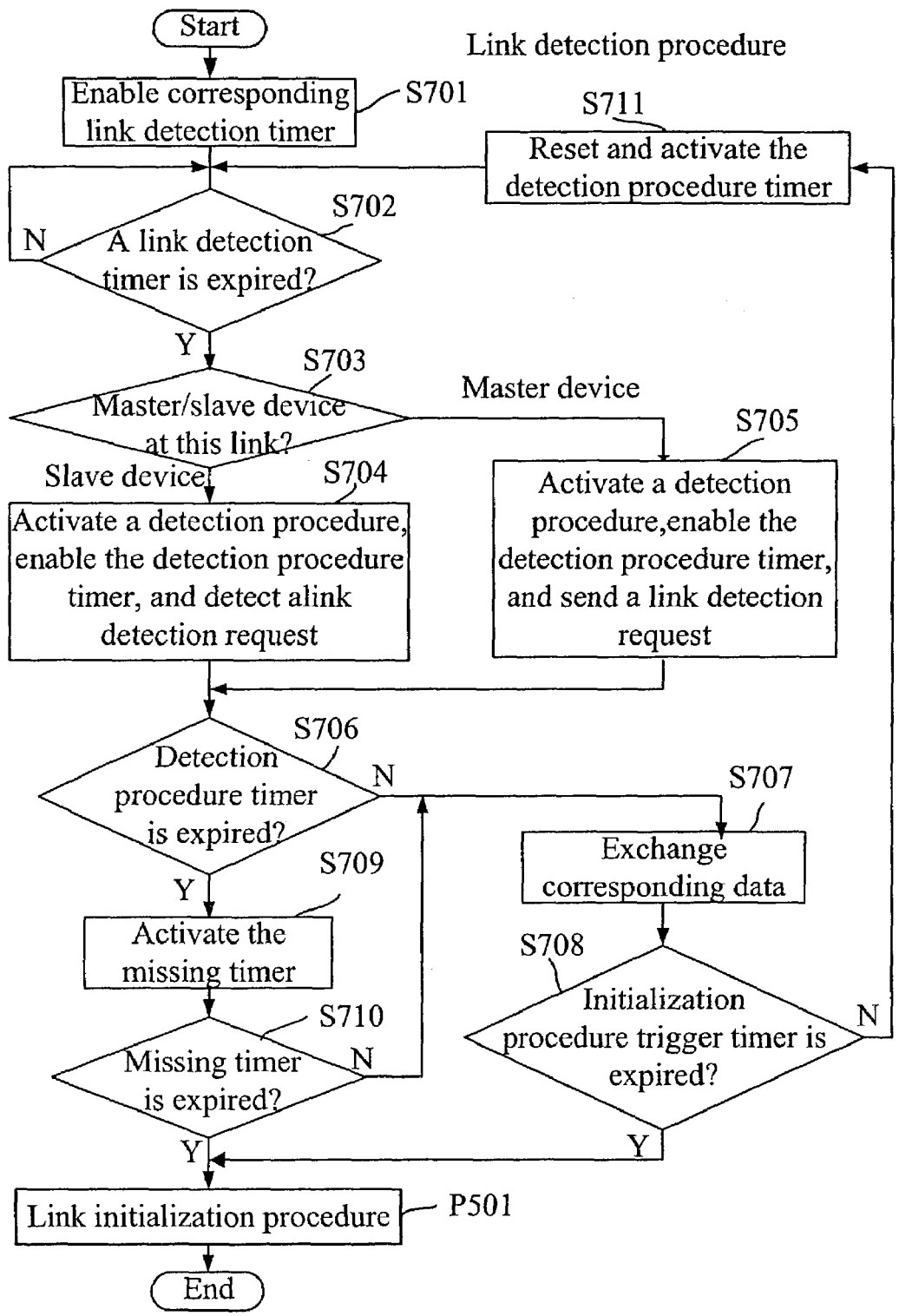
FIG. 7 shows the flowchart for link detection procedure of the present invention.

FIG. 7 shows the flowchart for link detection procedure (P503) in accordance with the present invention. As shown, in step S701, when initializing a link of the bluetooth device, the corresponding link detection timer is enabled. In step S702, it determines whether a link detection timer is expired or not. If it decides that the link detection timer is not expired, then the process goes back to the step S702, otherwise the process goes to step S703.

In step S703, it determines whether the device is a master or slave bluetooth device according to the status of the master/slave flag. If the device is a master bluetooth device, the process goes to step S705 to activate a detection procedure, enable the detection procedure timer, and send a link detection request to detect whether the expired link is existed or not. If the device is a slave bluetooth device, the process goes to step S704 to activate a detection procedure, enable the detection procedure timer, and detect whether a link detection request is received.

If the slave device receives a link detection request after executing the step S704, it updates the detection procedure timer. Similar to the master device that receives a response after executing the step S705, it also updates the detection procedure timer. It implies that, if the detection procedure timer is not expired, the link is still existed and the master device can transfer data packets to/from the slave device via the link. Thus, in step S706, it determines whether the detection procedure timer is expired or not. If yes, the process goes to the step S709, otherwise the process goes to the step S707 to exchange corresponding data between the master and slave device via the link. The corresponding data exchanging between the master and slave device includes queue size of the link, data transmission period, and next detection time.

In step S708, it determines whether the initialization procedure trigger timer is expired or not. If not, the process goes to step S711 to reset and activate the detection procedure timer and then goes to step S702, otherwise the process goes to procedure P501 to re-execute the link initialization procedure.

If it decides that the detection procedure timer is expired in step S706, the process goes to step S709 to activate the missing timer. In step S710, it determines whether the link missing timer is expired or not. If yes, it I means that the link is not existed and the process goes to procedure P501 to re-execute the link initialization procedure, otherwise the process goes back to step S707.

Figure 8:
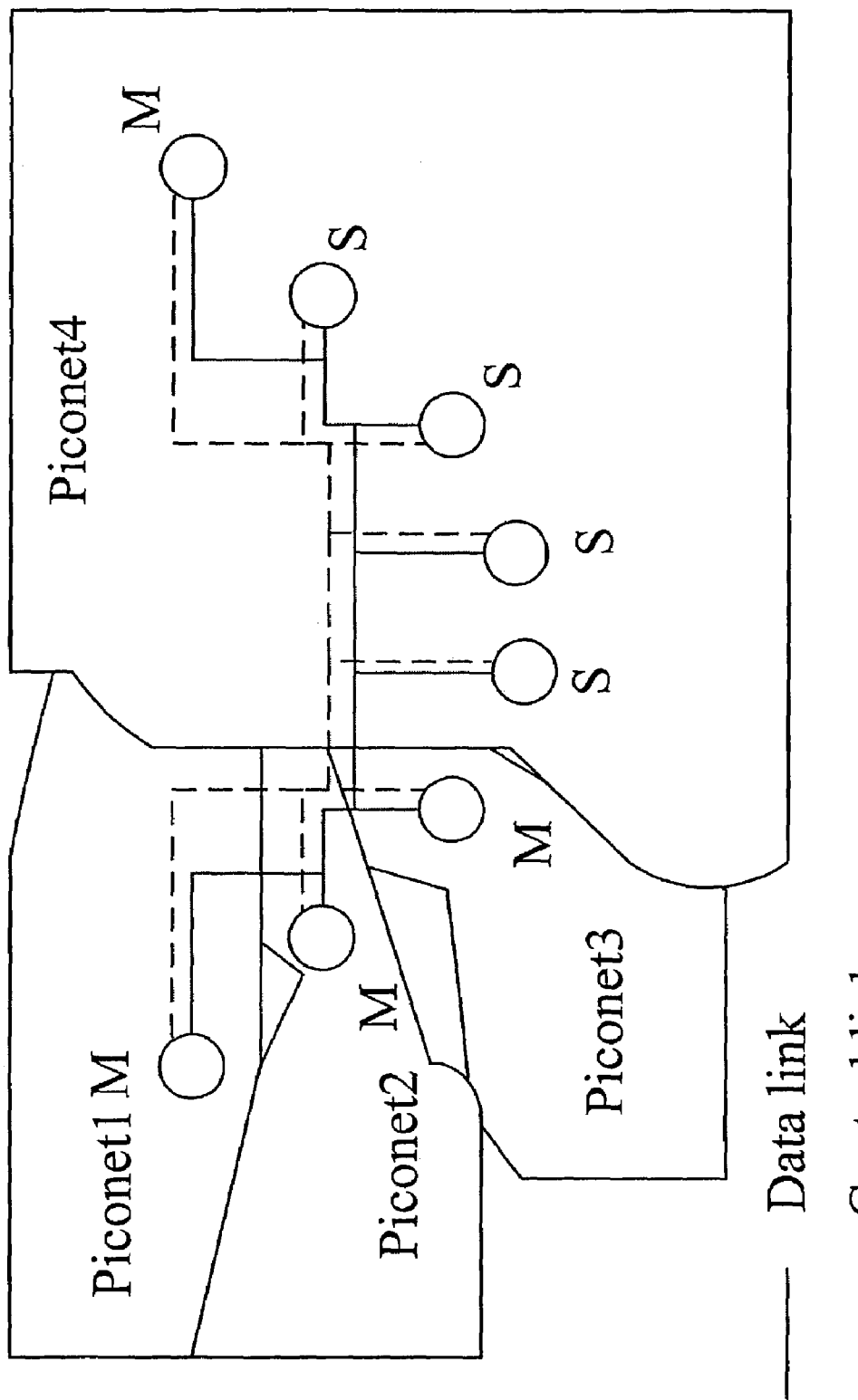
FIG. 8 schematically shows that bluetooth devices each located in different piconet respectively are linked to form a scatternet system according to the present invention.

FIG. 8 schematically shows that bluetooth devices each located in different piconet respectively are linked to form a scatternet system according to the present invention. As shown, the solid lines represent the data links that are transmitted/received via the bluetooth baseband and physical layer 200. The dash lines represent the control links that are transmitted/received via the bluetooth baseband and physical layer 300.

In view of the foregoing, it is known that the present invention utilizes the inter-link layer 140 and the baseband drivers 130 to avoid the aforementioned problem that data can only be transferred inside a specific piconet but not crossing the boundary of the piconet. It achieves the purpose of transferring data packets in a bluetooth scatternet, thereby removing the limitation of the conventional bluetooth technology.

Although the present invention has been explained in relation to its preferred embodiment, it is to be understood that many other possible modifications and variations can be made without departing from the spirit and scope of the invention as hereinafter claimed.

What is claimed is:

1. A link method for establishing a link between two bluetooth devices located in a bluetooth scatternet, the bluetooth device including multiple link detection timers, a detection procedure timer, multiple master/slave flags, an initialization procedure executing timer, an initialization procedure trigger timer and a link missing timer, the method comprising:

(A) a link initialization procedure for determining whether the role of this bluetooth device in a dedicated link is a slave or a master and initializing the corresponding timers when resetting or initializing a link, wherein the link initialization procedure further comprises:

(A1) setting up and activating the initialization procedure executing timer when a link is reset or initialized;

(A2) listening to a bluetooth channel;

(A3) determining whether the bluetooth device detects an inquiry packet or a paging packet;

(A4) setting the bluetooth device as a slave on the link if step (A3) determines that the bluetooth device detects an inquiry packet or a paging packet;

(A5) determining whether the procedure executing timer is expired or not;

(A6) setting up the multiple link detection timers, the detection procedure timer, the initialization procedure trigger timer and the link missing timer if step (A5) determines that the procedure executing timer is expired; and (A7) activating the initialization procedure trigger timer;

(B) a link search establishment procedure for searching all possible paths to transfer data packets and establishing a link path table; and (C) a link detection procedure for resuming to detect whether the link is existed or not when the corresponding link detection timer of a link expires after a predetermined period.

2. The link method for establishing a link between two bluetooth devices as claimed in claim 1, wherein when step (A5) determines that the procedure executing timer is not expired, step (A2) is executed.

3. The link method for establishing a link between two bluetooth devices as claimed in claim 1, wherein when step (A3) determines that the bluetooth device detects no inquiry packet or paging packet, the following steps are executed:
   (A8) sending an inquiry packet;
   (A9) determining whether response packets of the inquiry are received or not; and
   (A10) executing step (A5) when step (A9) determines that there is no response of the inquiry packet.

4. The link method for establishing a link between two bluetooth devices as claimed in claim 3, wherein when step (A9) determines that there is a response of the inquiry packet, the following step are executed:
   (A11) sending a paging packet and receiving its response, wherein the device becomes a master bluetooth device on the link and sets the master/slave flag as master state.

5. The link method for establishing a link between two bluetooth devices as claimed in claim 1, wherein the link detection procedure further comprises the following steps:
   (C1) enabling a link detection timer corresponding to a link initialization of a bluetooth device;
   (C2) determining whether the link detection timer is expired or not;
   (C3) determining whether the bluetooth device at this link is a master or slave bluetooth device according to the status of the master/slave flag when step (C2) determines that a link detection timer is expired;
   (C4) activating a detection procedure, enabling the detection procedure timer, and sending a link detection request when step (C3) determines that the bluetooth device is a master bluetooth device;
   (C5) determining whether the detection procedure timer is expired or not;
   (C6) exchanging corresponding data between the master and slave device via the link;
   (C7) determining whether the initialization procedure trigger timer is expired or not; and
   (C8) resetting and activating the detection procedure timer when step (C7) determines that the initialization procedure trigger timer is not expired.

6. The link method for establishing a link between two bluetooth devices as claimed in claim 5, wherein when step (C7) determines that the initialization procedure trigger timer is expired, a link initialization procedure (A) is executed.

7. The link method for establishing a link between two bluetooth devices as claimed in claim 5, wherein when step (C5) determines that the detection procedure timer is expired, the following step are executed:
   (C10) activating the link missing timer;
   (C11) determining whether the link missing timer is expired or not; and
   (C12) executing a link initialization procedure when step (C11) determines that the link missing timer is expired.

8. The link method for establishing a link between two bluetooth devices as claimed in claim 7, wherein when step (C11) determines that the link missing timer is not expired, the step (C6) is executed.

9. The link method for establishing a link between two bluetooth devices as claimed in claim 5, wherein when step (C3) determines that the bluetooth device at that link is a slave, a step (C5) is executed after activating a detection procedure, enabling the detection procedure timer, and detecting a link detection request.

10. The link method for establishing a link between two bluetooth devices as claimed in claim 5, wherein the corresponding data in step (C6) includes queue size of the link, data transmission period, and next detection time.

* * * * *